United States Patent [19]

Goldman

[11] Patent Number: 4,608,711
[45] Date of Patent: Aug. 26, 1986

[54] CELLULAR MOBILE RADIO HAND-OFF UTILIZING VOICE CHANNEL

[75] Inventor: Stuart O. Goldman, Columbus, Ohio

[73] Assignee: ITT Corporation, New York, N.Y.

[21] Appl. No.: 622,941

[22] Filed: Jun. 21, 1984

[51] Int. Cl.⁴ .......................... H04Q 7/04; H04B 7/00
[52] U.S. Cl. ....................................... 455/33; 455/56;
179/2 EB
[58] Field of Search ........................... 455/33, 54, 56;
179/2 EB

[56] References Cited

U.S. PATENT DOCUMENTS

| | | | |
|---|---|---|---|
| 4,144,412 | 3/1979 | Ito et al. | 455/33 |
| 4,475,010 | 10/1984 | Huensch et al. | 455/33 |
| 4,481,670 | 11/1984 | Freeburg | 455/33 |
| 4,485,486 | 11/1984 | Webb et al. | 455/33 |
| 4,556,760 | 12/1985 | Goldman | 455/33 |

Primary Examiner—Jin F. Ng
Attorney, Agent, or Firm—John T. O'Halloran; Jeffrey P. Morris

[57] ABSTRACT

In a cellular mobile radio-telephone system, a hand-off procedure is implemented by use of idle voice channel transceiver at relay stations of cells contiguous the site of a mobile station. The receiving portion of each transceiver is provided with tuning circuitry permitting a detuning from a preassigned idle channel frequency to the present broadcast frequency assignment of the mobile station. A set of measurements of broadcast signal is made at the detuned idle channels to determine the cell of best signal. The mobile station is then handed off to the cell of best signal.

6 Claims, 4 Drawing Figures

CELLULAR MOBILE RADIO HAND-OFF UTILIZING VOICE CHANNEL

BACKGROUND OF THE INVENTION

This invention relates to cellular mobile radio-telephony systems and, more particularly, to a hand-off operation wherein a communication channel, normally used for voice communication, is also used for monitoring the strength of signals transmitted from a mobile radio-telephony station of a mobile subscriber in order to select the next cell into which the mobile subscriber is to be handed off.

A system of interest in understanding celullar mobile radio is disclosed in a U.S. patent application entitled "Cellular Mobile Radio Service Telephone System" of S. O. Goldman et al having Ser. No. 457,155, filed Jan. 11, 1983 now U.S. Pat. No. 4,562,572, and assigned to the assignee hereof, which application is incorporated by reference herein in its entirety.

Cellular radio-telephony is used at numerous sites in this country and overseas. Such a telephone system permits communication between two mobile telephone stations as well as between a mobile telephone station and a fixed station.

Such systems are formed of clusters of cells wherein each cell is assigned to a predetermined set of voice frequency channels. The channels are spaced apart in the frequency spectrum so as to permit simultaneous transmission of many telephone conversations by many stations without interference between communications on the various channels. In order to insure that there is no interference between the assigned frequency channels of one cell and the assigned frequency channels of a contiguous cell, the individual channels in the contiguous cell are located at different portions of the frequency spectrum than the individual channels of the one cell. The same frequency channels are repeated at more remote cells, and the power of the signal transmission in any one channel is limited in amplitude so as to become attenuated to a sufficiently low, non-intefereing level, at the frequency channels of the remote cell.

Cellular mobile radio-telephone systems are described in the literature. One such system referred to as an "Advanced Mobile Phone Service" is described in *The Bell System Technical Journal*, January 1979, Vol. 58, No. 1, pp 1–269. Multiplexing of individual subscriber channels for communication via RF (radio frequency) link is accomplished, preferably, by means of statistical multiplexers. Such multiplexers are described in an article entitled "Controlling Data Communications: Statistical Multiplexer Moves In" by H. J. Hindin in *Electronics*, July 28, 1981, pp. 141–148, and in "A Buyers Guide to Today's Volatile Statistical Multiplexers" by J. H. Sharen-Guivel and A. A. Calson in *Data Communications*, March 1982, pp. 97–126. A switching configuration for a mobile system is disclosed in "A Distributed Switching Approach to Cellular Coverage" by R. E. Pickett in *Telecommunications Magazine*, February 1983. A network control system for use in cellular mobile radio-telephony may include the commercially available ITT System 1210 hardware and software.

In the construction of a cellular system, a group of the foregoing cells is clustered about a system switching network which dynamically allocates the available frequency channel in any one cell among the various mobile radio-telephones with which communication is desired at this instant. Such switching networks provide for the coupling of a telephone conversation of one frequency channel in a first cell with a second frequency channel in a second cell or, alternatively with a long distance trunk circuit which connects the first cell with a distance trunk circuit which connects the first cell with a desired cell in another cluster or with a fixed station. In addition, well-known control circuitry is provided for the transmission of command signals to the mobile stations for directing their respective transmissions on the allocated frequency channels.

As a mobile station moves from one cell to the next cell, a hand-off procedure is followed wherein the central switching network commands the mobile station to switch frequency from the channel which was used in the first cell to the frequency of a new channel to be used in the second cell. A characteristic in hand-off decision-making circuitry presently in use is the measurement of the amplitude of signal transmission with the mobile station. The communication system may include directional antennas at each cell site, the antennas designating specific azimuthal sectors showing generally the position of a mobile station within a cell. Thus, the signal strength or quality can serve as an indication that the mobile transmitter is centrally located within a cell, or is located near the boundary bf the cell. Thereby, by monitorting the amplitude or quality of such signal transmissions the decision-making circuitry of the hand-off apparatus is able to signal the system switching network at the appropriate time when a hand-off is to be made from one frequency channel to another frequency channel.

Under present regulations of the FCC (Federal Comnmucations Commission), cellular mobile radio-telephone systems comprising a set of cells are allocated 333 channels of which 21 channels are used for access and control purposes, such as the paging of a mobile station, while the remaining 312 channels are used for the transmission of voice and data. For example, the geographic area covered by the system may be divided into a cluster of fifteen cells having approximately twenty voice channels apiece, or a cluster of twenty cells having approximately fifteen voice channels apiece. The communication channels in each of the cells operate as part of a common network under a network control system in which the twenty-one access channels are available for tasks including the servicing of call attempt from and paging of mobile stations. Each voice channel would be shared on a statistical basis among numerous subscribers, such sharing being possible because not all subscribers wish to communicate at the same time. Thus, each channel may handle 20-30 subscribers just as a trunk line is shared among many subscribers.

A problem exists in presently configured cellular mobile radio systems in service due to the fact that, in cellular mobile systems presently in use at least one transceiver in each cell is reserved for purposes such as the locating of a mobile station, and therefore is not available for use in the communication of voice and data between subscribers. The mode of hand-off operation employed in present cellular mobile system necessitates the reservation of the foregoing locating transceiver in each cell of the system.

SUMMARY OF THE INVENTION

The aforementioned problem is overcome and other advantages are provided by a cellular mobile radio telephone system wherein the hand-off apparatus is modified, in accordance with the invention, to permit the use of an idle voice channel to be employed in hand-off procedures as well as at a latter time to be employed for the communication of voice and other forms of data between subscribers of the system.

In the construction of a cellular mobile radio telephone system, the electrical circuitry at each cell site comprises a set of transceivers of which one transceiver is tuned to the transmission and reception frequencies of each voice channel allocated to a cell. Thereby, the transceiver transmits voice via a predetermined transmission carrier frequency to a specific mobile station, and receives voice signals at a predetermined reception carrier frequency from the mobile station. The transmission and reception carrier frequencies are preset accurately to insure that there is no interference between channels of the cell nor with channels of adjacent cells. On the other hand, a receiver used in a locating function is provided with a variable tuning capability so as to be able to monitor the signal strengths of subscribers transmitting at any one of a number of frequencies allocated to a cell, as well as to transmissions at still further frequencies from neighboring cells. Thereby, a receiver in the access channel can gather signal strength information on any one of the subscribers in a cell or adjacent cells for use in a hand-off procedure.

In accordance with the invention, each transceiver in the circuitry at a cell site is modified to provide both a fixed and a variable tuned capability to the receiver therein. Tuning circuitr of the receiver is responsive to digital command signals which designate the use of the receiver of the transceiver for use in a locating function or for voice communication.

Hand-off procedures are implemented by computation equipment such as is currently employed in existing cellular mobile systems. The hand-off procedure of the invention is modified from that of present systems by applying locating frequency command signals to an idle receiver in any one of the voice channels, rather than to a receiver reserved solely for the purposes of locating a mobile subscriber. In the event that all voice channels are in use, in which case there is no idle voice channel available for a locating function, there would be no compromise of the hand-off process because, in such a situation, there could be no hand-off into a cell wherein all voice channels are occupied. Thereby, the foregoing modification of the transceivers at the cell site, in accordance with the invention, has provided a significant increase in the number of subscribers that can be served by the cellular mobile radio-telephone system with the same number of transceivers employed, or the same number of subscribers can be served with a reduction of the number of transceivers required.

BRIEF DESCRIPTION OF THE DRAWING

The aforementioned aspects and other features of the invention are explained in the following descripiton taken in connection with the accompanying drawing wherein.

DETAILED DESCRIPTION

Figure 1:
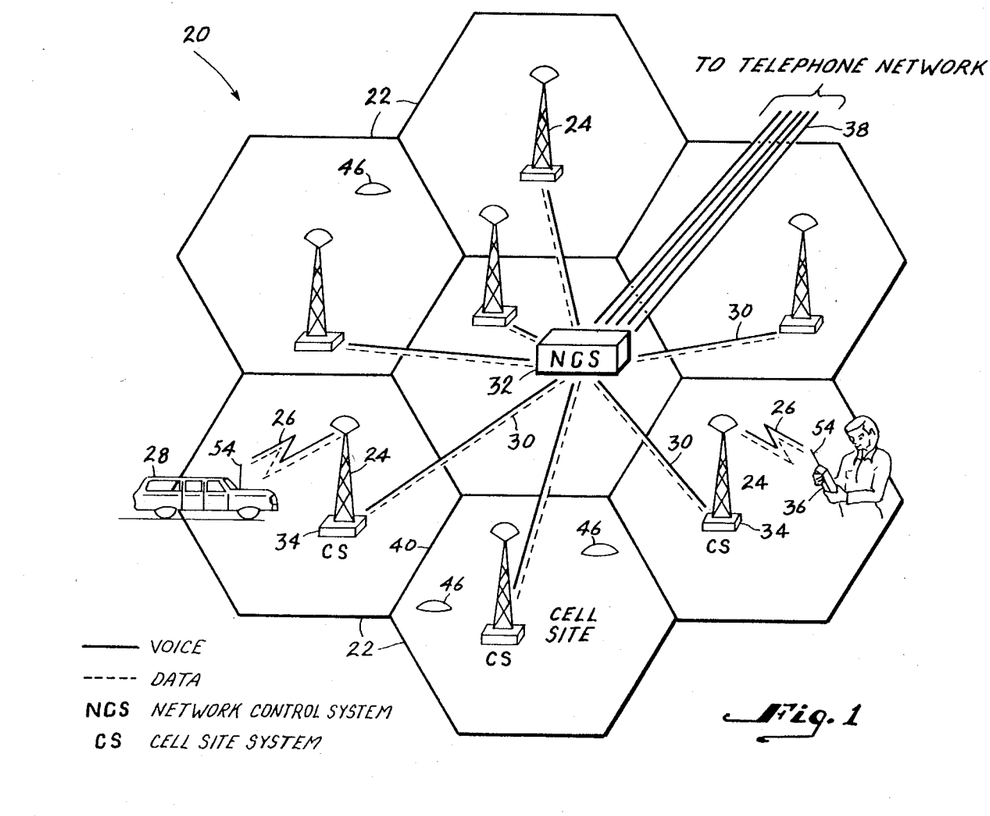
FIG. 1 is a diagrammatic view of a cellular mobile radio telephone system showing the various communication links whereby control and data signals are transmitted among mobile subscribers, stationary subscribers, and the transceiving stations of the respective cells.

FIG. 1 shows a typical cellular radio telephone system 20 comprising a set of contiguous cells 22. Each cell 22 is a site of an antenna 24 by which a radio communciation link 26 is established with a mobile subscriber such as a vehicle 28. The cells 22 are connected via communication links 30, which may be either radio or cable, to a network control system 32. At the site of each cell 22, a system 34 incorporating transceiver equipment (not shown in FIG. 1) connects with the antenna 24 for communication via a link 26 to a mobile subscriber and via a link 30 to the network control system 32.

The network control system 32 provides for communication between mobile subscribers in the same cell or two different cells, such as between the vehicle 28 in one cell 22 and a portable telephone 36 in a second cell 22, as well as with a stationary subscriber via trunk line 38 of a telephone network. Each of the links 26 and 30 includes both voice/data signals and control signals represented, respectively, by solid and dashed lines. The control signals carry the identity of a called subscriber in another one of the cells 22, as well as that of a mobile or stationary subscriber at a distant location which is to be reached via the system 32 and the trunk lines 38. The control signals also carry information with respect to a designated frequency channel to be employed by a cell system 34 in communication with a mobile subscriber.

As a mobile subscriber passes from one cell to the next cell, a hand-off procedure is followed at the interface between the two cells 22, such interface being in the vicinity of a border 40 between the two cells. The network control system 32 performs the hand-off procedure wherein, in accordance with established and well-known practice, a mobile subscriber such as the vehicle 28 is assigned a new frequency channel for transmission of voice and data along a link 26 to the system 34 of the new cell. It is noted that the frequencies of the voice transmission channel allocated to one of the cells 22 differs from those allocated to the contiguous cells 22. Thereby, each of the mobile subscribers has a separate channel so that there is no confusion as to subscriber signals, particularly near a border 40 wherein the signal of two vehicles 28 would be present on both sides of the border 40. The amplitudes of the transmitted signals of tne respective subscribers are maintained below a predetermined limit so as to avoid interference at longer distances spanning many of the cells 22. Thereby, at the longer distances, the same frequency channels can be reallocated without interference from a distant subscriber operating the same frequency channel.

The hand-off procedure is based on the location of the subsriber and the amplitude of or quality of signals received at a cell site from the subscriber via a link 26. The antenna 24 is positioned approximately at the middle of a cell 22 so that transmissions of a subscriber become attenuated as the subscriber moves toward the border 40. In additon, the antenna 24 includes sector antenna elements which provide information as to the location of the subscriber to enable determination of the cell toward which a subscriber is moving. This information is communicated via control signal to the network control system 32 which then selects a free frequency channel, and directs the transceiver operated by the subscriber to switch to the new frequency allocation.

Figure 2:
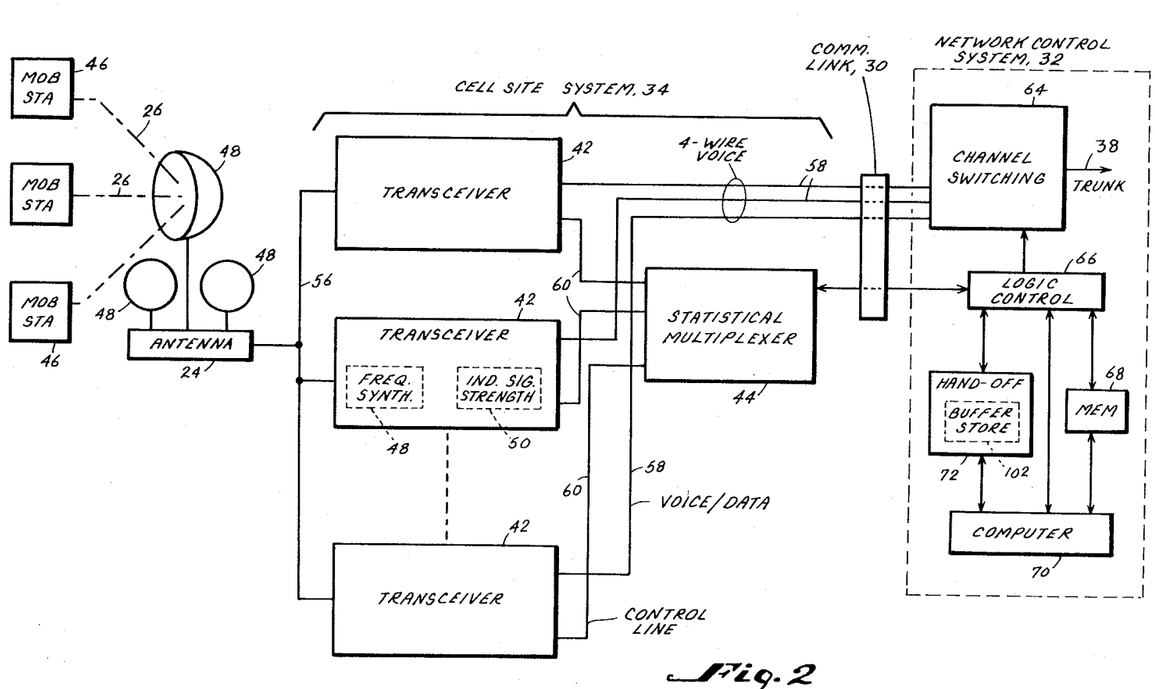
FIG. 2 is a block diagram showing the interconnection of transceivers at the cell site system hand-off apparatus of the network control system.

With reference also to FIG. 2, there is shown a simplified presentation of components of the system 20, the presentation showing only those portions of the system 20 which are necessary for an understanding of operation of the cell site system 34 in co-operation with the network control system 32 in carrying out the hand-off procedures of the invention. The system 34 includes a set of transceivers 42 and a statistical multiplexer 44. One transceiver 42 is provided for each voice channel. Control signals for operation of the transceivers 42 are multiplexed at the multiplexer 44 and are transmitted along with 4-wire voice signals of the transcievers 42 via the communication link 30 to the network control system 32.

FIG. 2 further shows the connection of the cell site system 34 to a set of mobile subscribers 46 via the communication links 26 from antenna 24. The transmit-recieve stations of the mobile subscribers 46 are understood to include the vehicle 28 and the portable telephone 36 of FIG. 1 as well as other forms of mobile stations indicated diagrammatically in FIG. 1. The antenna 24 includes an array of antenna elements 48 which provide azimuthal coverage about a cell 22, one of the elements 48 being shown communicating via the links 26 to subscriber 46. The array of elements 48 provide information as to the direction of a subscriber 46 from the site of the antenna 24, thereby to indicate which portion of a border 40 of a cell is to be involved in a hand-off procedure.

The electrical circuitry employed in a mobile subscriber station 46 is well known and, accordingly, is not shown in FIG. 2. Briefly the circuitry of a subscriber station 46 includes a telephone couple via a transceiver to an antenna. Operation of the transceiver is controlled by a microprocessor including a memory which stores information such as the identity of the subscriber. The transceiver includes a transmitter and a receiver, both of which are individually tuneable to specific frequencies commanded to the microprocessor via control signal transmitted along the links 26. Thus, the microprocessor is used to tune the receiver and the transmitter to the transmission and reception frequencies of the specific voice channel assigned to the mobile station of the subscriber 46. The memory also stores a program for the microprocessor used in responding to paging and hand-off command signals received via a link 26. The command of signals transmitted via the link 26 are in digital format, these signals being decoded by decoder circuitry at the subscriber station 46.

In accordance with the invention each of the transceivers 42 includes a frequency synthesizer 48 and a received signal strength indicator 50. As will be described in further detail hereinafter, the synthesizer 48 is responsive to a digital command signal generated at the network control system 32 and transmitted via the multiplexer 44 for tuning a receiver of the transceiver 42 to the transmission frequency of a mobile subscriber station 46 in an adjacent cell 22, thereby to participate in a locating function. In the absence of such command signal to the synthesizer 48, the transceiver 42 operates on its preassigned transmission and reception frequencies. The signal strength indicator 50 serves in a dual capacity. During normal operation of the transceiver 42 for the transmission of voice and data signals over a voice channel, the indicator 50 monitors the strength of the voice signal which may be filtered to avoid errionious action and, in the event that the strength drops below a predetermined value, sends a signal to the network control system 32 indicating that a hand-off to a voice channel in another cell is desired. Alternatively, when the transceiver 42 is utilized for locating a mobile subscriber station 46, the indicator 50 provides a digital signal indicating the magnitude of the subscriber signal for use in the hand-off operation of the network control system 32.

By way of alternative embodiments of the invention, it is noted that the indicator 50 may be located at a point of convenience in the fabrication of the system 20. Accordingly, the indicator 50 may be located at the site of the network control system 32 wherein access may be had to voice signal communicated between the cells 22, or the indicator 50 may be located at each of the cell site systems 34 at which points connection can be made with the voice channels. For example, such connection may be made on a time-shared basis. In either of the foregoing arrangements, a suitable indication of signal strength along a link 26 is obtained for use in the decision-making process involved in a hand-off. In the embodiment disclosed in FIG. 2, individual ones of the indicators 50 are provided in each of the transceivers 42 for individually monitoring each of the voice channels at each of the cell site systems 34.

As will be described hereinafter in further detail, each of the transceivers 42 comprises a transmitter 52 and a receiver 54 (FIG. 3) which are coupled via line 56 to the antenna 24, and to the network control system 32 vial a line 58 representing the aforementioned 4-wire voice connection. The aforementioned control signals are coupled between the transceivers and the multiplexer 44 by lines 60, and from the multiplexer 44 to the system 32 via line 62. Also shown in FIG. 2 is a simplified block diagram depicting the components of the network control system 32. It is to be understood that the general operation of a network control system, such as the system 32 is well known, and, accordingly, the presentation in FIG. 2 has been simplified so as to point out only those components necessary for an understanding of the operation of the invention. The system 32 includes switching equipment 64 connecting with the lines 58, the 4-wire lines 58 permitting two-way communication of voice signals bet-ween the transceivers and the switching equipment 64. The switching equipment 64 provides for the switching of signal among different ones of the assigned channels in different ones of the cells 22. Associated with the channel switching equipment 64 is a logic control unit 66, a memory 68, and a computer 70. The memory 68 stores the identifications of subscribers engaged in communications with each other, as well as the identification of the specific channels over which they are communicating. Also stored are the identities of channels available for use by the subscribers. The computer 70 connects with the logic unit 66 and the memory 68 for directing the switching equipment 64 to institute connections between the various channels so as to connect the individual subscribers engaged in their respective communications. Thereby, two-way communication is attained between a mobile subscriber station 46 along a link 26 with the antenna 24, the two-way communication path continuing from the antenna 24 via the line 56 to a transceiver 42, and from the transceiver 42 via a line 58 to the switching equipment 64.

The network control system 32 further comprises a hand-off unit 72 connected between the computer 70 and the logic control unit 66. By this connection, the computer 70 directs a switching of channels to accomplish a hand-off procedure. The hand-off unit 72 is involved in decision-making procedures which determine when and if a hand-off is to be instituted. While the hand-off unit 72 is shown separate from the computer 70 so as to facilitate explanation of the invention, it is to be understood that in a typical commercially available system the decision-making procedures would be accomplished within circuitry of the the computer 70 under suitable programming of the computer 70. Of course, in the event that heavy traffic may overload the computer, then the hand-off circuitry can always be provided as an additonal unit separate from the computer, which circuitry would be connected as shown by the hand-off unit 72 in FIG. 2. The logic control unit 66 is responsive to signals on line 62 from the statistical multiplexer 44 for applying these signals to the memory 68, the computer 70 and the hand-off unit 72 in accordance with protocol and identitiy of the respective signals. Command signals generated by the computer 70 and the hand-off unit 72 are applied to the logic unit 66 for transmission via line 62 to the multiplexer 44. In particular, the hand-off unit 72 is responsive to signals on line 60 from the indicater 50 of the current voice channel requesting a hand-off. The computer 70 transmits frequency command words via the lines 62 and 60 to the frequency synthesizer 48 in a transceiver 42 for tuning the transceiver 42 to locate specific mobile subscriber station 46. Prior to a hand-off, the hand-off unit 72 receives signal from. each of a set of the cells 22 of FIG. 1 surrounding a mobile subscriber station 46, these signal being received from indicators 50 in designated transceiver 42 of respective ones of the cells, thereby to obtain a set of measurements of signal strength as observed in each of the cells surrounding the mobile station. With the aid of the computer 70, and using programs as are currently employed in cellular mobile radio systems, the computer 70 with the hand-off unit 72 compares the relative amplitudes of the signals or quality of respective ones of the signals 50 to ascertain which of the cells receives the best signal. The hand-off is ordered to the cell receiving the best signal.

Figure 3:
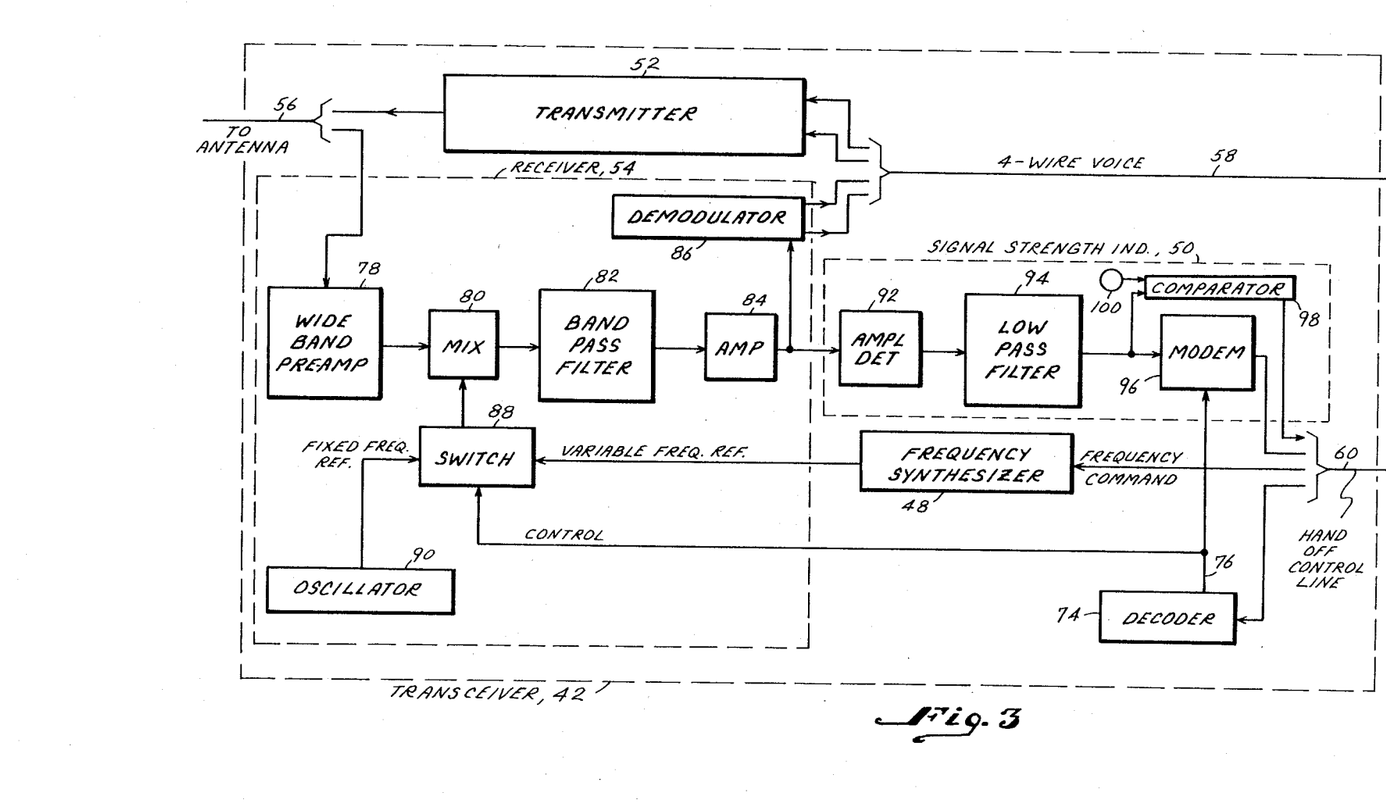
FIG. 3 is a block diagram of circuitry incorporating the invention within a transceiver of FIG. 2.

With reference also to FIG. 3, the components of a transceiver 42 and their operation in the hand-off procedure of the invention will be better understood. FIG. 3 shows the aforementioned transmitter 52, receiver 54, synthesizer 48, and indicator 50. In addition, the transceiver 42 comprises a decoder 74 connected to the line 60 for decoding the digitally-formatted signals on line 60 to provide command signals on line 76 for use by the receiver 54 and the indicator 50. The receiver 54 comprises a wide band preamplifier 78, a mixer 80, a band pass filter 82, an amplifier 84, a demodulator 86, a switch 88, and an oscillator 90. The indicator 50 comprises an amplitude detector 92, a low pass filter 94, a modem 96, and a comparator 98.

In operation, the transmitter 52 receives a voice signal on two of the wires of line 58, and transmits the signal via line 56 and the antenna 24 to a mobile subscriber station 46. The preamplifier 78 of the receiver 54 receives incoming signals of the station 46 via the antenna 24 and line 56. The frequencies of transmission and reception are sufficiently widely spaced along the frequency spectrum so as to prevent any significant interference between transmitted and received signals. The preamplifier 78 has sufficient bandwidth to encompass all frequencies which may be transmitted along the voice channel from the mobile station 46. The oscillator 90 provides a reference signal having a fixed frequency, the reference signal being coupled by the switch 88 to the mixer 80. The mixer 80 mixes the output signal of the preamplifier 78 with the reference signal to provide an intermediate frequency signal to the filter 82. The passband of the filter 82 is equal to the bandwidth of a single voice channel, approximately 3500 Hertz. The frequency of the reference signal is preset in accordance with the specific channel to which the receiver 54 is tuned.

Thus, only one input voice signal will be passed by the filter 82, this corresponding to the value of frequency to which the oscillator 90 has been preset. The output signal of the filter 82 is amplified by the amplifier 84 and applied to the demodulator 86. Depending on whether amplitude modulation, phase modulation, or frequency modulation has been employed by the mobile station 46, the demodulator 86 comprises well known demodulation circuitry for demodulating either the amplitude modulation, the phase modulation, or the frequency modulation to provide the voice signal on two wires of the line 58. Thereby, the signal received by the transceiver 42 is applied via the line 58 and the communication link 30 to the network control system 32.

The indicator 50 operates as follows. The detector 92 receives the voice signal at the intermediate frequency from the amplifier 84 and detects the amplitude or quality thereof. The output signal of the detector 92 is applied to the filter 94 which has a response time on the order of 10-100 milliseconds. Thus the combined action of the detector 92 and the filter 94 is to provide a signal at the output of the filter 94 which is an average value of the amplitude of the incoming voice signal as averaged over an interval of time ranging over the foregoing 10-100 milliseconds. The bandwidth of the filter 94 is, thus, substantially less than that of the filter 82 so that the ouput signal of the filter 94 is a measure only of the fading of the incoming voice signal. Any rapid fluctuations in the incoming voice signal are averaged by the filter 94. Thus, the output signal of the filter 94 may be regarded as a smoothed measurement of the amplitude of the incoming voice signal.

The output amplitude measurement of the filter 94 is compared by the comparator 98 with a reference signal from a reference source 100 to provide an output signal when the measured amplitude or signal quality drops below the value of the reference signal. Thus, the output signal of the comparator 98 serves as a request for a hand-off which is transmitted via the line 60 and the multiplexer 44 to the network control system 32. The request for the hand-off by the comparator 98 occurs whenever the measured voice channel amplitude drops below the preset reference signal of the source 100. The foregoing operation pertains to the use of the transceiver 42 for transmission of voice/data signals in an assigned voice channel.

In accordance with the invention, the transceiver 42 can also be utilized as a component of an access channel in which case the transceiver 42 participates in locating function for determining into which cell 22 a mobile subscriber station 46 is to be handed off. In the performance of the locating function, typically, several transceivers 42 in a cluster of cells surrounding the mobile station 46 participate. The transceiver 42 in each of the cells is tuned to the frequency of the voice transmission channel of the particular mobile station 46 which has requested a hand-off. The respective transceivers 42 participating in a locating function provide a set of measurements of subscriber transmitted signal as received in the corresponding ones of the cells 22. These measurements are then communicated by the lines 60 to the network control system 32 which then compares the measured signal strength to select the cell 22 reporting the strongest signal. The mobile station 46 is then handed off to cell 22 reporting the best signal.

It is also noted that the indicator 50 is operative for measuring the strength of a voice signal received by the receiver 54 when the receiver 42 is operating in its normal mode of communicating a voice signal along a preassigned channel. This result occurs due to the fact that an output signal is produced by the filter 94 whether the transceiver 42 is tuned to its assigned communication channel or whether it is tuned for the locating function. Accordingly, by way of alternative procedure in the hand-off operation, a measured signal amplitude or quality can also be provided by the transceiver 42 which is communicating the voice signal of the mobile source 46 which has requested the hand-off. In the alternative mode, the hand-off procedure of the network control system 34 would also provide for the comparison of the amplitude measurement of the foregoing transceiver with the measurements of the other several transceivers. In the event that the foregoing transceiver 42 which carries the communication of the mobile station 46 prior to the hand-off were to show a better signal than any of the other transceivers participating in the locating function, then the hand-off would be delayed until such time as the signal measurement reported by another cell exceeds that reported by the transceiver presently carrying the mobile station transmission.

The operation of the transceiver 42 is switched from normal operation to the locating function by a digital command word transmitted over the line 60 from the multiplexer 44 to the decoder 74. The decoder 74 decodes the command word to provide a signal on line 76 which activates the modem 96 and the switch 88. The modem 96 includes well-known analog-to-digital conversion circuitry and converts the analog signal appearing at the output of the filter 94 to a multi-bit digital word which is transmitted along the line 60 to the multiplexer 44, and then via the line 62 to the network control system 32. The signal transmitted by the line 96 is the amplitude of the voice signal received by the receiver 54. Upon activation of the switch 88, a variable frequency reference from the synthesizer 48 is applied by the switch 88, in lieu of the fixed frequency reference, to the mixer 80. The frequency synthesizer 48 employs well known commercially available circuitry such as a phase locked loop employing a digital divider in the feed back loop, which divider operates in response to a frequency command word generated in the network control system 32 and applied via the multiplexer 44 and line 60 to the synthesizer 48. By use of the reference signal provided by the sythesizer 48, the receiver 54 is tuned to a different transmitted value of voice signal from a mobile subscriber station 46. The frequency command signal is generated by the computer 70 (FIG. 2) in co-operation with the hand-off unit 72 and the memory 68, and is applied to all of the transceivers 42 which are participating in the locating function. Thereby, the receivers 54 of the respective transceivers 42 are all tuned in to the same frequency transmission from the mobile station 46. Prior to the hand-off, the mobile station 46 is broadcasting at a preassigned frequency, which frequency is stored in the memory 68. The locating function is thus attained by tuning the receivers 54 to the value of frequency stored in the memory 68 for the specific one of the mobile stations 46 which has requested a hand-off.

Figure 4:
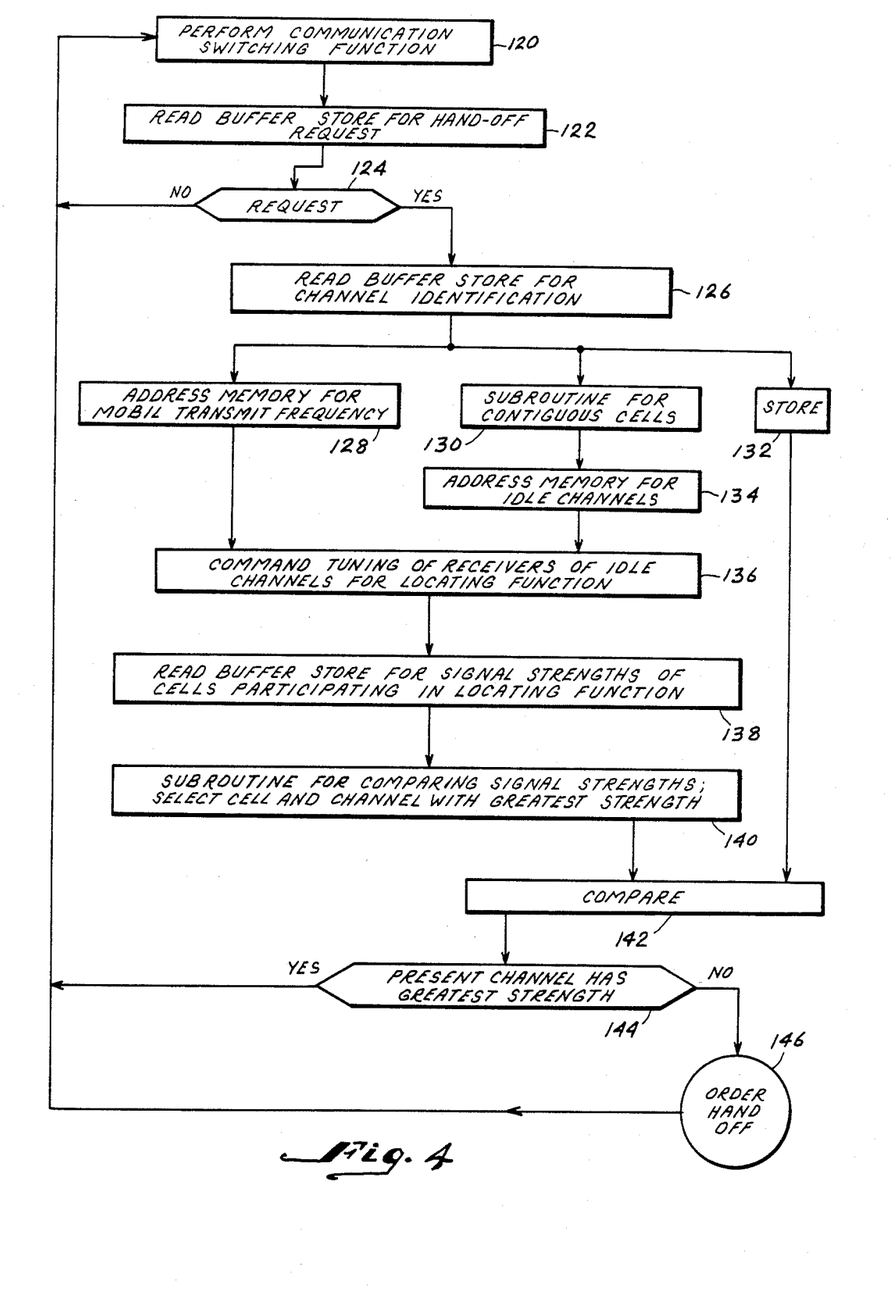
FIG. 4 is a flow chart disclosing a sequence of operations for commanding the circuitry of FIG. 3 to operate in either of the modes of voice communication and the locating of a mobile station.

FIG. 4 shows a flow chart useful in explaining the operation of the computer 70 (FIG. 2) in utilizing the hand-off data provided by the transceiver 42 (FIG. 3). The hand-off unit 72 is presumed to include a buffer store 102 which holds information obtained from the transceivers 42 participating in the locating function. Thus, data of the transceivers 42 arriving from the multiplexer 44 over line 62 is separated at the logic control unit 66 with hand-off signals being directed to the buffer store 102.

The flow chart begins with block 120 wherein the computer 70 is performing its usual communication switching function which directs the switching equipment 64 to make the desired connections between the various subscribers and the various channels. At on point in the routine of the communication switching function, the computer reads the buffer store 102 to determine if any hand-off requests have been made, this being indicated in block 122. The result of the reading, at block 124 may be that no request has been made, in which case the communication switching function is resumed. If a request has been made, then at block 126 the buffer store is read further to provide the identification of the channel which the mobile station 46 is employing. In accordance with the data formatting, hand-off signals transmitted by a transceiver 42 to the multiplexer 44 are formatted with a channel identification. With reference to the foregoing example of a cellular system having 333 channels, wherein any one channel is employed by only one mobile subscriber at a time, the channel identification also enables identification of the cell and the subscriber.

Upon obtaining the identity of the channel from which a hand-off has been requested, the computer now performs three separate functions identified by the blocks 128, 130, 132. In block 128 the memory 68 is addressed to obtain the corresponding transmission frequency from the mobile station. At block 130 a well known subroutine is implemented for determining the identity of cells 22 contiguous to the cell from which the hand-off has been requested. At block 132 the identity of the present communication channel is stored, the present channel being the channel from which a hand-off request has been requested.

Upon completion of the subroutine for the contiguous cells at block 130, the memory 68 is addressed, block 134, to obtain the identification of idle channels whithin respective ones of the contiguous cells. Upon obtaining the identification of the idle channels, the computer continues to proceed, block 136, by generating command signals which command the tuning of the receivers of the idle channels to the broadcast frequency of the mobile station requesting the hand-off. This accomplished by applying the frequency command signal to the synthesizer 48 in each of the transceivers 42, as well as applying the command signal to the decoders 74 in respective ones of the transceivers 42.

In response to the commanding of the locating transceivers 42 to switch frequency to that provided by the frequency synthesizer 48 in the respectve transducers 42, thereby to tune in on the broadcast of the mobile subscriber, the locating transceivers 42 begin to provide data at the ouput terminals of their respective modems 96. Accordingly, the computer operation then continues, at block 138, with a reading of the buffer store 102 to obtain the signal strengths or quality as measured by the transceivers 42 in the cells participating in the locating function. Thereafter, at block 140 a well known subroutine is initiated for comparing the signal and for selecting the cell and channel having the best signal. At block 142, the identity of the channel with the best signal is compared to the identity of the present channel stored at block 132. As a result of the comparison, at block 144, if the present channel still has a better signal than any of the other channels to which a hand-off may be attempted, then the operation reverts to block 120 wherein the computer resumes its normal communication switching functions. This will. provide time for the mobile subscriber to travel to a further location wherein another channel may sense a better signal. In the event that the comparison at block 144 shows that the signal of the present channel is not as good as that of the selected channel of block 140, the computer orders a hand-off at block 146. The hand-off operation then proceeds in accordance with established operation wherein the frequencies of the new link 26 are transmitted to the mobile subscriber for automatic switching of the subscriber transmitter and receiver to the frequencies of the new channel.

As set forth in the foregoing description, the invention provides for an improvement in cellular moibile radio-telephony systems wherein a transceiver, normally used in a cell site system for voice communication in a pre-assigned channel, can now be used for an additional function such as the locating of a mobile station. The additional function is attained by providing the transceiver with further tuning capability wherein the transceiver can be tuned to another frequency band upon receipt of a digital command signal. A set of the transducers is employed with hand-off circuitry in the network control system to provide a set of signal measurements which are compared to determine the best signal. The cell having the best signal is deemed to be the cell into which the mobile station should be handed off. By virtue of the system of the the invention, it is now no longer necessary to set aside separate transceiver for locating functions and for voice communication channels; the transceivers can now provide both functions with a significant increase in the amount of subscribers which can be serviced by the cellular mobile radio-telephony system. The invention is conveniently implemented within an existing cellular system because the additional tuning circuitry required for the locating function can be included with the transceiver electronics at a station in each cell, which stations houses the antenna and other components of the cell sie communication system. A further station located within a cluster of the cells and housing the network control system would requre essentially no changes in circuitry since the existing computer and hand-off circuitry can be utilized for carrying out the invention by a modification to existing programming.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. In a cellular mobile communication system wherein mobile stations having transceivers can communicate with each other, the system being arranged in a set of cells wherein each cell has a cell station for communication with individual ones of said mobile stations, there being a set of communication channels assigned to each of said cells, each of said channels being available for use in carrying a communication of one of said mobile stations, the set of channels assigned to one of said cells differing from the set of channels assigned to a second of said cells contiguous said one cell, the cell station in each of said cells having receivers each tuned to respective ones of the channels assigned to the cell for receiving signals of the mobile stations within the cell, a cluster of said cells having a network control system through which said cell stations communicate with each other, said network control system operating in conjunction with hand-off apparatus for handing off a mobile station from a first of said cells to a second of said cells as the mobile station travels from the first cell to the second cell, said hand-off apparatus being responsive to the strength or quality of signals of a mobile station monitored in a group of cells contiguous said first cell; the improvement wherein each of said cell-station receivers comprises means for tuning the receiver to a channel of a contiguous cell, thereby providing an idle channel to monitor the signal of a mobile station in a contiguous cell; and wherein said hand-off apparatus comprises:

means for activating the tuning means in one of said receivers in each of a plurality of said cells for reception of a channel assigned to another of said cells, thereby to provide measurement signals indicating the signal strength or quality of a mobile station in said another cell;

means for storing the measurement signal of a group of cells contiguous said another cell;

means coupled to the storing means for comparing the measurement signals and for selecting the best of the measurement signals; and means for designating the cell associated with the best measurement signal to receive a hand-off of the transceiver.

2. A cellular communication system according to claim 1 further comprising:

means associated with each of said receivers for measuring the stength or quality of a mobile-station signal received by the receiver in the channel initially assigned to the mobile station, thereby to provide a further monitoring signal indicating the strength or quality measured at the cell station of the cell wherein the mobile station is located; and wherein said storing means of said hand-off apparatus also stores said further monitoring signal, therby delaying a hand-off from a first cell to a second cell until the signal at the second cell is better than the signal at the first cell.

3. A cellular mobile communication system according to claim 2 further comprising means in the receiver of said initially assigned channel for comparing and monitoring signal with a reference signal, said comparing means signalling a request for hand-off when said signal in said assigned channel drops below the said reference signal.

4. In a cellular mobile radio-telephony system comprising a group of cells each of which is provided with a cell station having a communication system incorporating a set of transceivers preassigned to specific communication channels for carrying communications of mobile stations located within the cell, a method of hand-off by reallocating a portion of each of said transceivers for use in a function of locating the mobile station during a procedure of handing off a mobile station between cells, said method comprising:
   storing the identity of the channel assigned to a mobile station in a first one of said cells;
   identifying idle channels in other cells contiguous said first cell;
   in the transceivers of each of the other cells contiguous said first cell having said idle channels, tuning a receiving portion of each transceiver to the receiving frequency of said assigned channel;
   monitoring the signal from the mobile station received at each transceiver in the other cells contiguous said first cell having said idle channels;
   selecting the monitored best signal and
   ordering a hand-off of the mobile station from said first cell to the cell having the best signal.

5. In a cellular mobile system, a method according to claim 4 further comprising steps of:
   monitoring the signal in the assigned channel;
   comparing said best signal with the signal of the assigned channel; and
   delaying a hand-off when the signal of the assigned channel is better than said best signal.

6. In cellular mobile system, a method according to claim 5 further comprising the step of restoring the tuning of the receiving portion of the transceiver of each idle channel to a preassigned fixed frequency at the conclusion of a hand-off.

* * * * *